(12) United States Patent
Ahn et al.

(10) Patent No.: US 9,379,371 B2
(45) Date of Patent: Jun. 28, 2016

(54) SECONDARY BATTERY

(75) Inventors: Changbum Ahn, Yongin-si (KR);
Jeongsoon Shin, Yongin-si (KR);
Youngbae Sohn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 898 days.

(21) Appl. No.: 12/955,850

(22) Filed: Nov. 29, 2010

(65) Prior Publication Data

US 2011/0129711 A1  Jun. 2, 2011

(30) Foreign Application Priority Data

Dec. 1, 2009  (KR) ........................ 10-2009-0117577

(51) Int. Cl.
*H01M 2/06* (2006.01)
*H01M 2/26* (2006.01)
*H01M 2/30* (2006.01)
*H01M 2/02* (2006.01)

(52) U.S. Cl.
CPC ............ *H01M 2/266* (2013.01); *H01M 2/0285* (2013.01); *H01M 2/0287* (2013.01); *H01M 2/06* (2013.01); *H01M 2/263* (2013.01); *H01M 2/30* (2013.01)

(58) Field of Classification Search
USPC ................... 429/163, 179, 185, 181
See application file for complete search history.

(56) References Cited

U.S. PATENT DOCUMENTS

| | | | |
|---|---|---|---|
| 3,522,507 A | 8/1970 | Seiger | |
| 6,482,544 B1 * | 11/2002 | Shiota et al. | 429/185 |
| 7,014,950 B2 * | 3/2006 | Ozawa et al. | 429/187 |
| 2004/0091771 A1 * | 5/2004 | Hosaka et al. | 429/185 |
| 2004/0121231 A1 * | 6/2004 | Kim | 429/181 |
| 2004/0224227 A1 | 11/2004 | Ozawa et al. | |
| 2006/0068277 A1 | 3/2006 | Kim et al. | |
| 2008/0076020 A1 | 3/2008 | Wu | |
| 2009/0035658 A1 | 2/2009 | Harada et al. | |
| 2010/0055558 A1 | 3/2010 | Choi et al. | |
| 2010/0255368 A1 | 10/2010 | Park et al. | |

FOREIGN PATENT DOCUMENTS

| | | |
|---|---|---|
| EP | 0 984 499 A1 | 3/2000 |
| JP | 2002-252036 | 9/2002 |
| JP | 2003-151529 | 5/2003 |
| JP | 2004-266091 | 9/2004 |
| JP | 2009-260086 | 11/2009 |
| KR | 20-0394701 | 8/2005 |

(Continued)

OTHER PUBLICATIONS

Machine Translation of Japanese Publication No. JP 2002-252036 dated Sep. 6, 2002, pp. 15.

(Continued)

*Primary Examiner* — Maria J Laios
(74) *Attorney, Agent, or Firm* — Lewis Roca Rothgerber Christie LLP

(57) ABSTRACT

A secondary battery including: an electrode assembly including a plurality of first and second electrode plates, and a plurality of separators between the first and second electrode plates; a first electrode tab on the first electrode plate, and a second electrode tab on the second electrode plate; a case housing the electrode assembly, and the first and second electrode tabs; and first and second external lead terminals at an outer side of the case and electrically coupled to the first and second electrode tabs, respectively.

15 Claims, 5 Drawing Sheets

(56) References Cited

FOREIGN PATENT DOCUMENTS

| KR | 10-20060047039 A | 5/2006 |
| KR | 10-0659887 B1 | 12/2006 |
| KR | 10-20070099430 A | 10/2007 |
| KR | 10-2008-0109948 | 12/2008 |
| KR | 10-2009-0065587 | 6/2009 |

OTHER PUBLICATIONS

English Machine Translation of JP 2004-266091 listed above, 26 pages.

European Extended Search Report dated Mar. 7, 2011, issued by the EPO to the European Patent Application No. 10193372.9, 5 pages.

KIPO Office action dated Apr. 8, 2011, for Korean priority Patent application 10-2009-0117577.

Japanese Office Action dated Aug. 21, 2012 issued in Japanese Application No. 2010-127651, 3 pages.

English Machine Translation of JP 2003-151529, 13 pages.

English Machine Translation of JP 2009-260086, 30 pages.

SIPO Office Action dated Aug. 9, 2013 for Chinese Patent Application No. 201010568033.8, 6 pgs.

\* cited by examiner

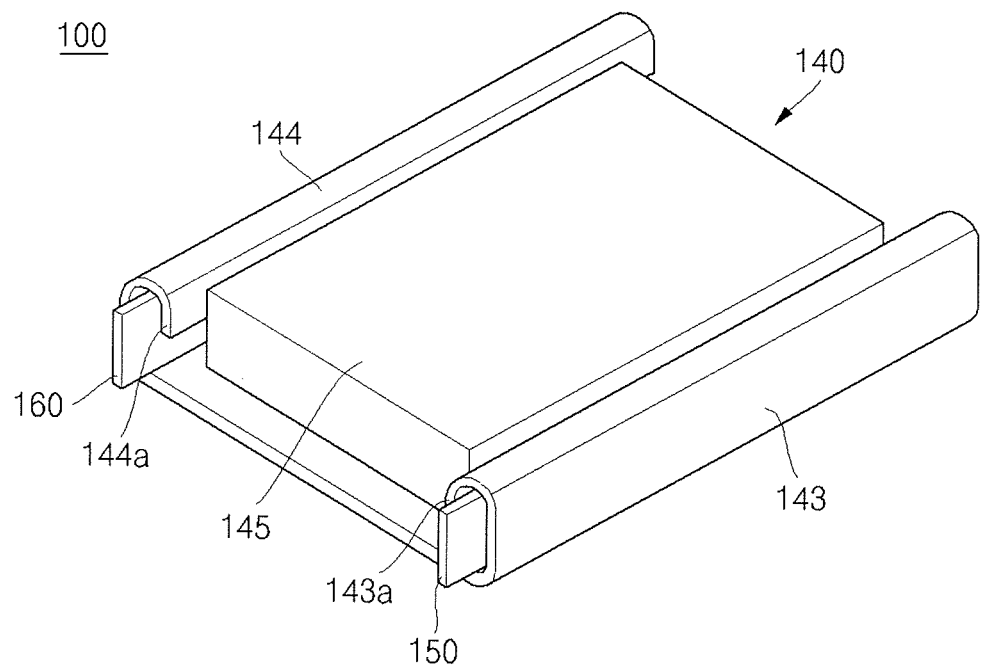

SECONDARY BATTERY

CROSS-REFERENCE TO RELATED APPLICATIONS

This application claims priority to and the benefit of Korean Patent Application Serial No. 2009-0117577, filed on Dec. 1, 2009, in the Korean Intellectual Property Office, the entire content of which is incorporated herein by reference.

BACKGROUND

1. Field

One or more embodiments of the present invention relate to a secondary battery.

2. Description of the Related Art

Secondary batteries have been esteemed as power sources for a variety of electronic and communication devices as they are rechargeable and portable.

In typical secondary batteries, electrode plates and separators are alternately stacked, or a stacked and wound-type electrode assembly is mounted in a case. In this case, an electrode tab is attached to the electrode plate of the electrode assembly, and an end portion of the electrode tab outwardly protrudes when the electrode assembly is mounted in the case. The electrode tab protruding from the case is electrically connected to an external electrode lead.

Here, leakage may occur from a contact portion with an electrode tab at an edge of a case that is a sealing portion.

Also, the electrode tab protruding from the case is welded to the external electrode lead. The electrode tab is coupled to the external electrode lead, which is located at a separate space outside the sealing portion of the case. Here, a separate space may be required, regardless of the capacity of the battery. The separate space ranges from about 15% to about 30% of the total volume of the battery pack. Accordingly, the total capacity of the battery may be reduced.

Additionally, the combination structure of the electrode tab and the external electrode lead has a mechanical safety limitation. The electrode tab and the external electrode lead are typically coupled by a welding method. Since a welding portion of the electrode tab and the external electrode lead is exposed to the outside of the case, the welding portion may be easily separated by contact with other components or external impacts.

SUMMARY

An aspect of embodiments of the present invention is directed toward a secondary battery that can inhibit reduction of sealing strength of a sealing portion caused when an electrode tab is protruded from a case.

Another aspect of embodiments of the present invention is directed toward a secondary battery with an enlarged internal capacity by excluding a space in which an electrode tab protrudes to the outside for coupling.

Another aspect of embodiments of the present invention is directed toward a secondary battery that can ensure mechanical safety at a coupling portion of an electrode tab and an external electrode lead.

An embodiment of the present invention provides a secondary battery including: an electrode assembly including a plurality of first and second electrode plates, and a plurality of separators between the first and second electrode plates; a first electrode tab on the first electrode plate, and a second electrode tab on the second electrode plate; a case housing the electrode assembly, and the first and second electrode tabs; and first and second external lead terminals at an outer side of the case and electrically coupled to the first and second electrode tabs, respectively.

The first and second external lead terminals may be encompassed by the case.

The first and second external lead terminals may be encompassed by sealing portions of the case.

Sealing portions of the case may be folded to encompass the first and second external lead terminals.

Sealing portions of the case may be folded to encompasses the first and second external lead terminal so that the first and second lead terminals are not exposed to the outside, and adhere the first or second lead terminals to the electrode assembly.

The case may include through holes corresponding to the first and second electrode tabs, respectively, and the first and second external lead terminals are coupled to the first and second electrode tabs, respectively, through the through holes.

The case may include first and second internal lead terminals between the first and second electrode tabs, and the first and second external lead terminals, respectively.

The first and second external lead terminals may be welded to the first and second internal lead terminals.

The first and second external lead terminals may be welded to the first and second internal lead terminals by ultrasonic welding or resistance welding.

The secondary battery may further include insulating layers between the case, and the first and second internal lead terminals, respectively.

The secondary battery may further include insulating layers between the case, and the first and second external lead terminals, respectively.

The electrode assembly may be a stacked-type, wherein the plurality of first electrode plates, the plurality of separators, and the plurality of second electrode plates are sequentially stacked.

The electrode assembly may be a jelly rolled-type, wherein the plurality of first electrode plates, the plurality of separators, and the plurality of second electrode plates are sequentially stacked and wound.

The first and second electrode tabs may be attached to the first and second electrode plates, respectively, at opposite sides of the electrode assembly.

The case may be a pouch-type case.

The case may include a laminate sheet comprising aluminum or an alloy thereof.

BRIEF DESCRIPTION OF THE DRAWINGS

The accompanying drawings, together with the specification, illustrate exemplary embodiments of the present invention, and, together with the description, serve to explain the principles of the present invention.

FIG. 8 illustrates a perspective view of a secondary battery with folded sealing portions according to an embodiment of the present invention.

DETAILED DESCRIPTION

Figure 1:
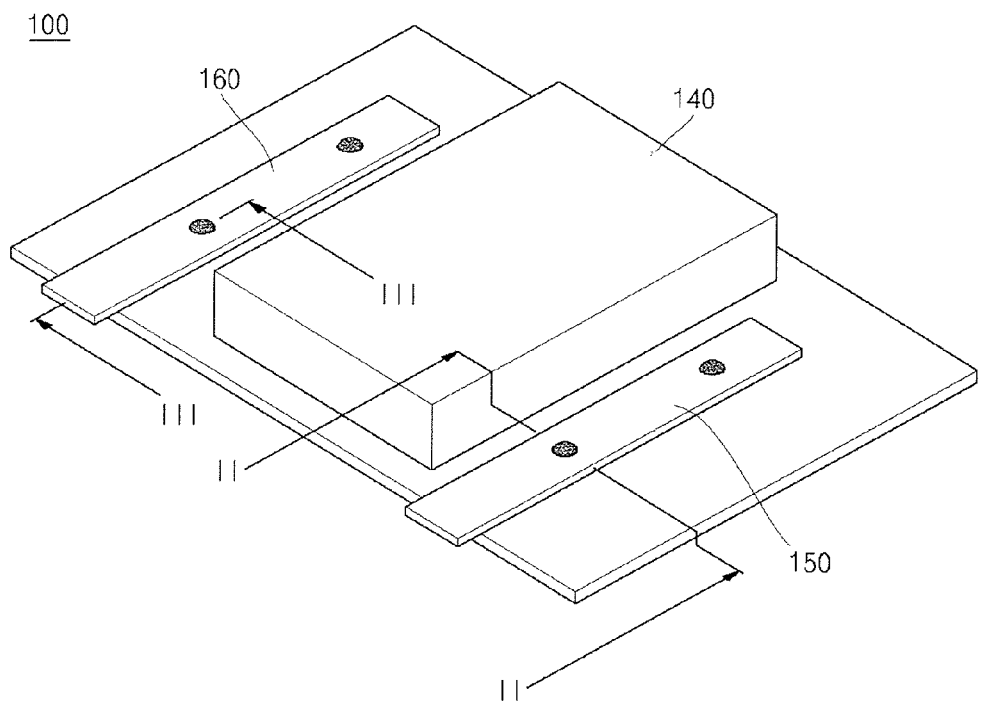
FIG. 1 illustrates a perspective view of a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
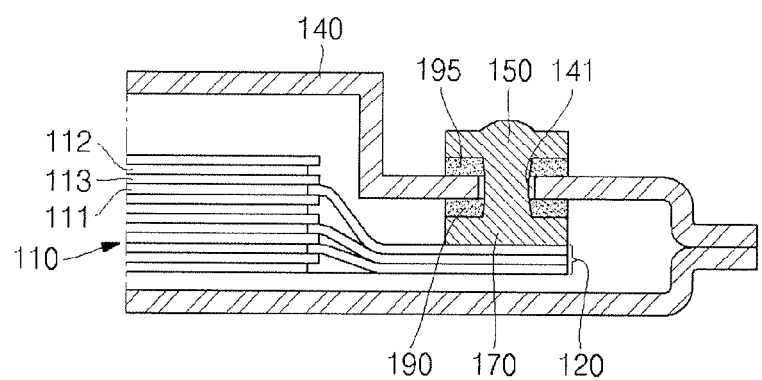
FIG. 2 illustrates a cross-sectional view taken along line II-II of FIG. 1.
Figure 3:
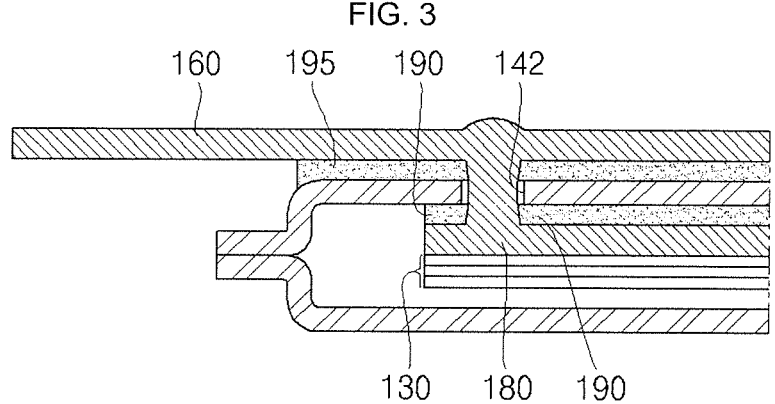
FIG. 3 illustrates a cross-sectional view taken along line III-III of FIG. 1.
Figure 4:
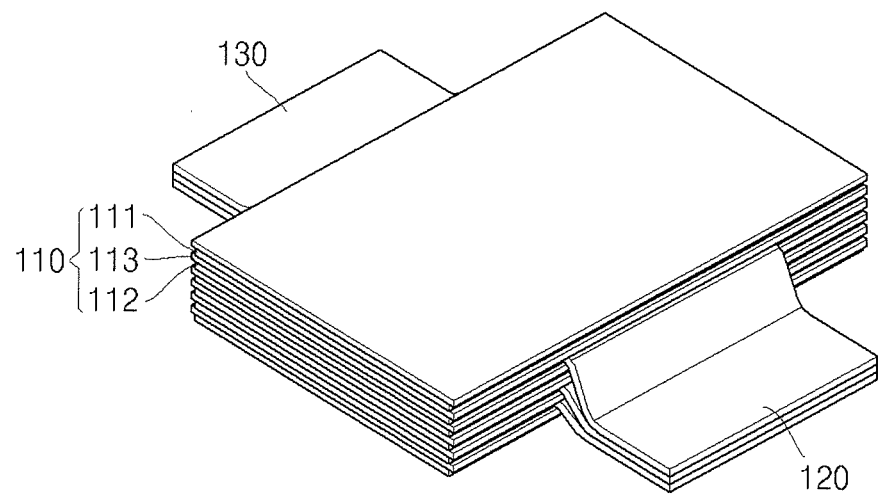
FIG. 4 illustrates a perspective view of an electrode assembly attached with an electrode tab.
Figure 5:
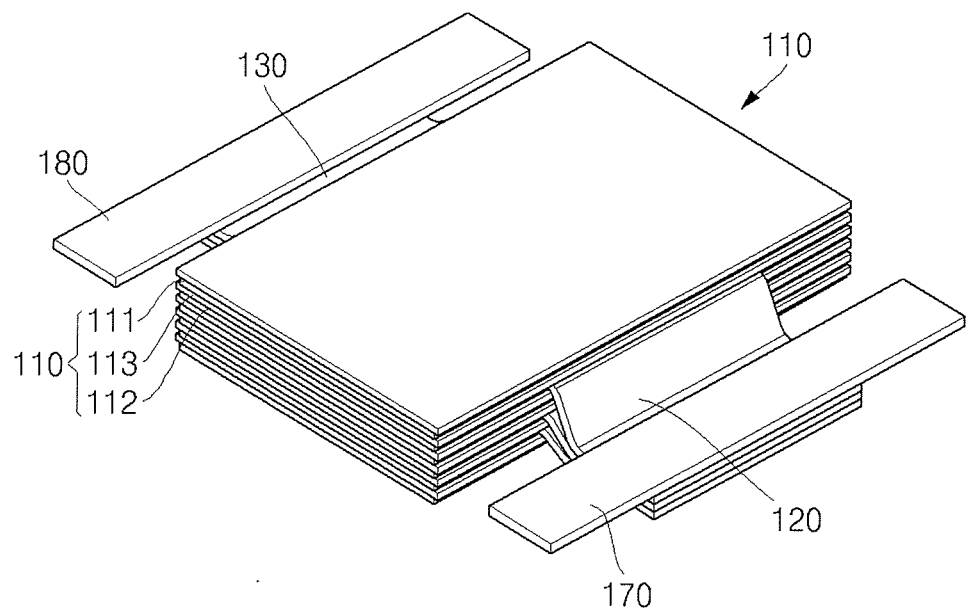
FIG. 5 illustrates a perspective view of first and second internal electrode leads coupled to an electrode tab.
Figure 6:
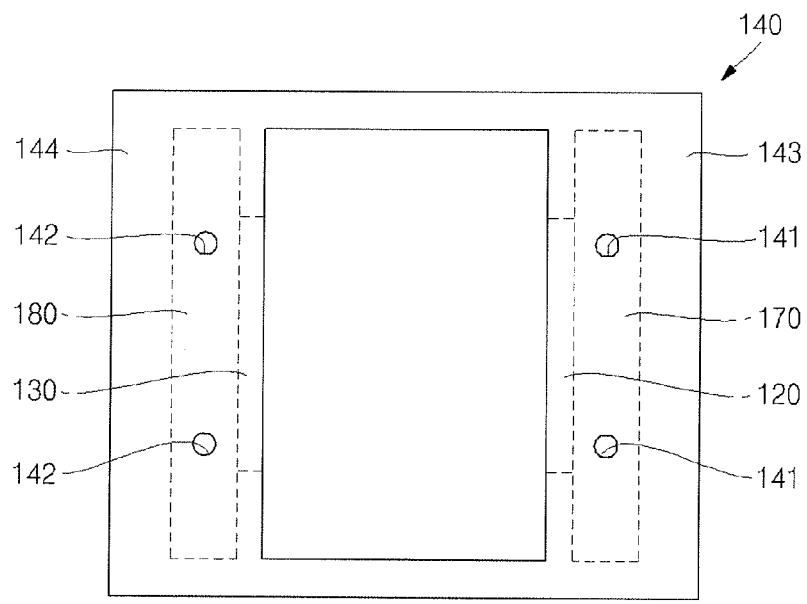
FIG. 6 illustrates a plan view of an electrode assembly, an electrode tab, and first and second internal electrode leads mounted in a pouch.
Figure 7:
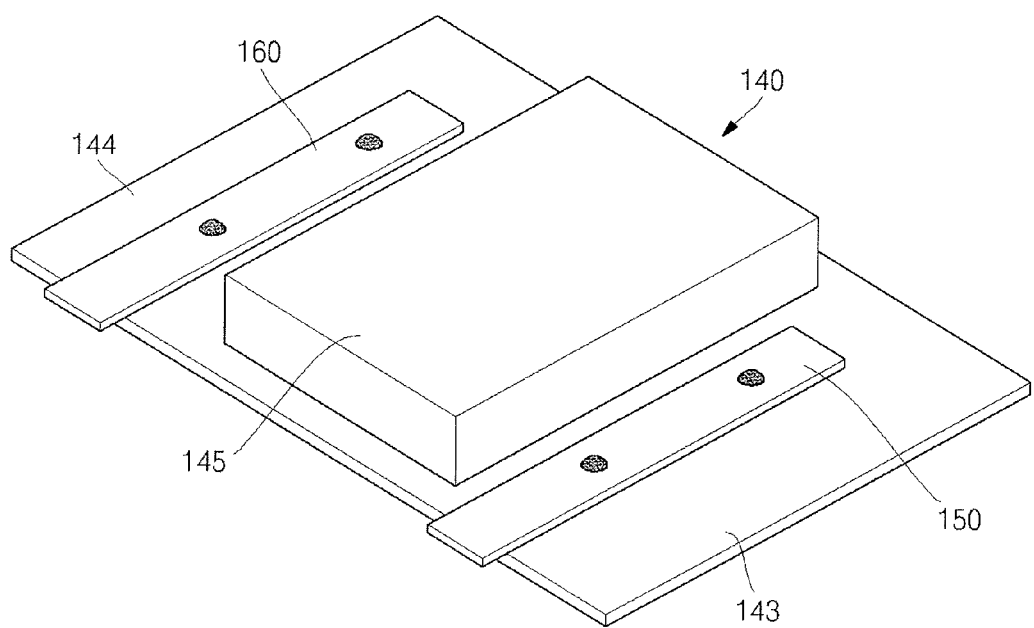
FIG. 7 illustrates a perspective view of first and second external electrode leads coupled to a pouch.

FIG. 1 illustrates a perspective view of a secondary battery according to an embodiment of the present invention. FIG. 2 illustrates a cross-sectional view taken along line II-II of FIG. 1. FIG. 3 illustrates a cross-sectional view taken along line III-III of FIG. 1. FIGS. 4 through 8 illustrate perspective views or plan views of a process for manufacturing a secondary battery according to an embodiment of the present invention. FIG. 4 illustrates a perspective view of an electrode assembly attached with an electrode tab. FIG. 5 illustrates a perspective view of first and second internal electrode leads coupled to an electrode tab. FIG. 6 illustrates a plan view of an electrode assembly, an electrode tab, and first and second internal electrode leads mounted in a pouch. FIG. 7 illustrates a perspective view of first and second external electrode leads coupled to a pouch. FIG. 8 illustrates a perspective view of a secondary battery with folded sealing portions according to an embodiment of the present invention.

A second battery 100 according to an embodiment of the present invention includes an electrode assembly 110 having a plurality of positive electrode plates 111 and negative electrode plates 112 that are alternately stacked, a plurality of separators 113 interposed between the positive electrode plates 111 and the negative electrode plates 112, a positive electrode tab assembly 120 having a plurality of positive electrode tabs attached to the respective positive electrode plates 111, a negative electrode tab assembly 130 having a plurality of negative electrode taps attached to the respective negative electrode plates 112, a pouch-type case (hereinafter, referred to as "pouch") 140 that is sealed in a state where the electrode assembly 110 and the positive and negative electrode tabs assemblies 120 and 130 are mounted therein, and external positive electrode and negative electrode leads 150 and 160 that are installed at an external side of the pouch 140 and are respectively coupled to the positive electrode and negative electrode tab assemblies 120 and 130.

The positive electrode tab assembly 120 and negative electrode tab assembly 130 are mechanically and electrically coupled to the external positive electrode lead 150 and the external negative electrode lead 160, respectively, through a resistance welding, such as an ultrasonic welding or a spot welding. Here, through holes 141 and 142 are formed at portions of the pouch 140 corresponding to welded portions of the positive electrode tab assembly 120 and the negative electrode tab assembly 130 coupled to the external positive electrode lead 150 and the external negative electrode lead 160, respectively. The through holes 141 and 142 may be formed to have a greater diameter than the welded portions of the positive electrode tab assembly 120 and the negative electrode tab assembly 130 coupled to the external positive electrode lead 150 and the external negative electrode lead 160, respectively. Thus, the pouch 140 may not be damaged when the positive electrode tab assembly 120 and the negative electrode tab assembly 130 are coupled to the external positive electrode lead 150 and the external negative electrode lead 160, respectively. In an embodiment of the present invention, the external positive electrode lead 150 may be fused with the internal positive electrode lead 170, and the external negative electrode lead 160 may be fused with the internal negative electrode lead 180.

The electrode assembly 110 is a stack-type electrode assembly in which the plurality of the electrode plates 111 and the plurality of the negative electrode plates 112 are alternately stacked, and the plurality of the separators 113 are interposed between the electrode and negative electrode plates 111 and 112. This stack-type electrode assembly 110 is suitable for realizing a large capacity battery. The positive electrode plate 111 includes a positive electrode collector having a coated part on which a positive electrode active material is coated and an uncoated part on which no active material is coated. The separator 113 is interposed between the positive electrode and negative electrode plates 111 and 112. The separator 113 may be formed of any materials that can enable electrons to travel. The separator 113 may be formed in a single layer or multiple porous layers formed of polyethylene, polypropylene, or the like.

At least one positive electrode tab of a positive electrode tab assembly 120 is attached to each positive electrode plate 111. Also, at least one negative electrode tab assembly 130 is attached to each negative electrode plate 112. In this case, the position of the positive electrode tab assembly 120 attached to the positive electrode plate 111 is opposite to the position of the negative electrode tab assembly 130 attached to the negative electrode plate 112. To implement a large-capacity secondary battery according to an embodiment of the present invention, an electrode tab may be formed to have a greater width. In this case, since the electrode tabs are attached to the electrode plate in different directions, the two electrode tabs may not interfere with each other. Accordingly, the width of the electrode tabs can be increased to implement a large-capacity battery.

According to the manufacturing conditions of a battery, however, the positive electrode tab and the negative electrode tab may be attached to the positive electrode tab and the negative electrode tab in the same direction.

The pouch 140 may accept an electrode assembly 110. In this case, the electrode assembly 110, in which the positive electrode plates 111 and the negative electrode plates 112 are attached to the positive electrode tab assembly 120 and the negative electrode tab assembly 130, respectively, is mounted in the pouch 140.

The pouch 140 may be formed to have an internal space to accept the electrode assembly 110. Here, the pouch 140 may be formed of one folded sheet, three sides of which are sealed with the electrode assembly 110 accepted and electrolyte injected. Alternatively, the pouch 140 may be formed using two sheets, four sides of which are sealed after the electrode assembly is accepted and the electrolyte is injected. In this case, three layers may be coupled to form the pouch 140. That is, an internal surface layer may be formed on the inside of the pouch 140. The internal surface layer may be formed of thermoplastic resin materials having suitable (or excellent) electrolyte resistance, such as polyethylene, polypropylene, and polyamide. On the other hand, an external surface layer of the pouch 140 may be formed of an insulating resin materials having suitable (or excellent) electric insulation property, such as polyamide-based resin and polyester-based resin. A metal layer formed of a metal having suitable (or excellent) flexibility and strength, such as aluminum and stainless steel, may be interposed between the internal and external surface layers.

The external positive electrode lead 150 is installed corresponding to the through hole 141 formed at a portion where the positive electrode tab assembly 120 is located in the pouch 140. The external negative electrode lead 160 is installed corresponding to the through hole 142 formed at a portion where the negative electrode tab assembly 130 is located in the pouch 140. Thus, the positive electrode tab assembly 120 is welded to the external positive electrode lead 150 through the through hole 141. Also, the negative electrode tab assembly 130 is welded to the external negative electrode lead 160 through the through hold 142. The external positive electrode lead 150 may be formed of the same material as the positive electrode tab assembly 120. That is, the external positive electrode lead 150 may be formed of aluminum or an alloy thereof, but embodiments of the present invention are not limited thereto. The external negative electrode lead 160 may be formed of the same material as the negative electrode tab assembly 130. That is, the external negative electrode lead 160 may be formed of copper, stainless steal, and/or nickel, but embodiments are not limited thereto.

An internal positive electrode lead 170 may be further installed at the uppermost end of the positive electrode tab assembly 120, and an internal negative electrode lead 180 may be further installed at the uppermost end of the negative electrode tab assembly 130 in the pouch 140. Accordingly, the positive electrode tab assembly 120 may be coupled to the internal positive electrode lead 170 to have an electrical coupling structure, and the negative electrode tab assembly 130 may be coupled to the internal negative electrode lead 180 to have an electrical coupling structure. In this structure, the external positive electrode lead 150 may be coupled to the internal positive electrode lead 170 through the through hole 141, and the external negative electrode lead 160 may be coupled to the internal negative electrode lead 180 through the through hole 142. The internal positive electrode lead 170 and the internal negative electrode lead 180 may be formed of the same material as the coupled components, but embodiments of the present invention are not limited thereto.

An insulating layer 190 may be formed between the pouch 140 and the internal positive and negative electrode leads 170 and 180. A method for forming the insulating layer 190 may include attaching an insulating tape on the surfaces of the internal positive electrode lead 170 and the internal negative electrode lead 180, or coating suitable insulating materials, well-known in the art, on the surfaces of the internal positive electrode lead 170 and the internal negative electrode lead 180. The insulating layer 190 may serve to inhibit a short circuit of the internal positive electrode lead 170 or the internal negative electrode lead 180. Also, the insulating layer 190 may serve to facilitate a sealing of the pouch 140, and the internal positive and negative electrode leads 170 and 180.

An insulating layer 195 may also be formed between the pouch 140, and the external positive and negative electrode leads 150 and 160. A method for forming the insulating layer 195 may include attaching an insulating tape on the surfaces of the external positive electrode lead 150 and the external negative electrode lead 160 or coating suitable insulating materials, well-known in the art, on the surfaces of the external positive electrode lead 150 and the external negative electrode lead 160. The insulating layer 195 may serve to inhibit a short circuit of the external positive electrode lead 150 or the external negative electrode lead 160. Also, the insulating layer 190 may serve to facilitate a seal (or implement a sealing) with the pouch 140.

Hereinafter, a process for manufacturing a secondary battery according to an embodiment of the present invention will be described based on the fabrication order with reference to FIGS. 4 through 8.

As shown in FIG. 4, a plurality of separators 113 are located between positive and negative electrode plates 111 and 112 to form a stacked electrode assembly 110. A positive electrode tab assembly 120 is attached to the positive electrode plates 111 of the electrode assembly 110, and a negative electrode tab assembly 130 is attached to the negative electrode plates 112. In this case, the positive electrode tab assembly 120 and the negative electrode tab assembly 130 may be attached in different directions.

As shown in FIG. 5, an internal positive electrode lead 170 is installed at the uppermost end of the positive electrode tab assembly 120, and an internal negative electrode lead 180 is installed at the uppermost end of the negative electrode tab assembly 130. The internal positive electrode lead 170 and the internal negative electrode lead 180 may be coupled to the positive electrode tab assembly 120 and the negative electrode tab assembly 130, respectively, by a welding method.

As shown in FIG. 6, the pouch 140 may accept the electrode assembly 110 attached with the positive electrode tab assembly 120 and the negative electrode tab assembly 130, and the internal positive electrode lead 170 and the internal negative electrode lead 180 coupled to the positive electrode tab assembly 120 and the negative electrode tab assembly 130, respectively. Then, after electrolyte is injected, three or four sides of the pouch 140 are sealed.

The through holes 141 and 142 are formed at both sides of the pouch 140. The through hole 141 may be formed to correspond to the positive electrode tab assembly 120 and the internal positive electrode lead 170. The through hole 142 may be formed to correspond to the negative electrode tab assembly 130 and the internal negative electrode lead 180.

FIG. 7 illustrates that the external positive electrode lead 150 and the external negative electrode lead 160 installed on the outside of the pouch 140 are coupled to the internal positive electrode lead 170 and the internal negative electrode lead 180, respectively, mounted in the pouch 140. Thus, the external positive electrode lead 150 and the external negative electrode lead 160 are welded to the internal positive electrode lead 170 and the internal positive electrode lead 180, respectively, through a resistance welding method, such as an ultrasonic welding or a spot welding. In this case, the through holes 141 and 142 of the pouch 140 are formed greater in size than welded portions, thereby preventing the pouch 140 from being melted or damaged. Leakage from the through holes 141 and 142 can be inhibited by the insulating layer 195 between the pouch 140 and the external electrode leads 150 and 160, and the insulating layer 190 between the pouch 140 and the internal electrode leads 170 and 180.

As shown in FIG. 8, both sealing portions 143 and 144 are vertically folded in the direction of the main body 145 of the pouch 140. Then, both ends 143a and 144a of sealing portions 143 and 144 are folded or bent so that the external electrode leads 150 and 160 are substantially surrounded (or encompassed) by the sealing portion 143 and 144, respectively. At this time, the first and second external lead terminals 150 and 160 are preferably disposed in parallel with surfaces of the case 140.

Thus, the external electrode leads 150 and 160 are substantially surrounded by sealing portions 143 and 144, respectively, to be adhered to the main body 145 of the pouch 140, thereby enabling the total size to be minimized.

Thus, an electrode tab is not protruding from a pouch, but is welded to an external electrode lead through a through hole. Accordingly, the sealing strength at a sealing portion of the pouch can be increased.

Also, since the electrode tab does not protrude to the outside and is welded to the external electrode lead, the lengths of the electrode tab and the electrode lead need not be elongated, thereby saving space. Accordingly, the capacity of a battery can be increased by about 15% to about 30%. Furthermore, the electrode tab mounted in the pouch is coupled to the external electrode lead in a stacked structure, thereby not limiting the thickness of the electrode tab.

In addition, since a welding portion of the electrode tab and the external electrode lead is not exposed to the outside by the sealing portion of the pouch, the mechanical safety can be enhanced at the coupling portion of the electrode tab and the external electrode lead.

A secondary battery according to an embodiment of the present invention has an effect of maintaining a sealing portion of a case in a good sealing state because an electrode tab is mounted in the case together with an electrode assembly.

Furthermore, the electrode tab can be mounted in the case to be coupled to the external electrode lead provided on the outside of the case. Accordingly, the welding portion of the electrode tab and the external electrode lead is not exposed to the outside, thereby increasing mechanical safety at the coupling portion of the electrode tab and the external electrode lead.

Although the electrode assembly according to the embodiment of the present invention has been described as a stacked-type of a first electrode plate, a separator, and a second electrode plate, the electrode assembly may be a jelly rolled-type in which the first electrode plate, the separator, and the second electrode plate, are successively stacked and wound. This may correspond to a variation that could be easily practiced by those skilled in the art although a separate accompanying drawing is not attached.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
    an electrode assembly comprising at least one first electrode plate, at least one second electrode plate, and at least one separator between the first and second electrode plates;
    a first electrode tab connected to the first electrode plate, and a second electrode tab connected to the second electrode plate;
    a case housing the electrode assembly, and the first and second electrode tabs, the case having an outer surface and a plurality of through-holes;
    first and second external lead terminals located on an outer side of the case and electrically coupled to the first and second electrode tabs, respectively; and
    first and second internal lead terminals within the case and directly contacting the first and second external lead terminals, respectively,
    wherein the first internal lead terminal and the first external lead terminal are fused together as a single integral component and wherein the second internal lead terminal and the second external lead terminal are fused together as a single integral component such that a portion of at least the first internal or external terminal is within a first one of the through-holes and a portion of at least the second internal or external terminal is within a second one of the through-holes.

2. The secondary battery as claimed in claim 1, wherein the first and second external lead terminals are encompassed by the case.

3. The secondary battery as claimed in claim 1, wherein the first and second external lead terminals are encompassed by sealing portions of the case.

4. The secondary battery as claimed in claim 1, wherein sealing portions of the case are folded to encompass the first and second external lead terminals.

5. The secondary battery as claimed in claim 1, wherein sealing portions of the case are folded to encompasses the first and second external lead terminals, and the first and second external lead terminals are oriented in parallel with surfaces of the case.

6. The secondary battery as claimed in claim 1, wherein the first and second external lead terminals are coupled to the first and second electrode tabs, respectively, through a respective one of the through holes.

7. The secondary battery as claimed in claim 1, wherein the first and second internal lead terminals are located between the first and second electrode tabs, and the first and second external lead terminals, respectively.

8. The secondary battery as claimed in claim 1, wherein the first and second internal lead terminals are located between the first and second electrode tabs, and the case, respectively.

9. The secondary battery as claimed in claim 1, wherein the first and second external lead terminals are electrically coupled to the first and second internal lead terminals.

10. The secondary battery as claimed in claim 7, further comprising insulating layers between the case, and the first and second internal lead terminals, respectively.

11. The secondary battery as claimed in claim 1, wherein the electrode assembly is stacked, wherein the plurality of first electrode plates, the plurality of separators, and the plurality of second electrode plates are sequentially stacked.

12. The secondary batter as claimed in claim 1, wherein the electrode assembly is a jelly roll electrode assembly in which the plurality of first electrode plates, the plurality of separators, and the plurality of second electrode plates are sequentially stacked and wound.

13. The secondary battery as claimed in claim 1, wherein the first and second electrode tabs are attached to the first and second electrode plates, respectively, at opposite sides of the electrode assembly.

14. The secondary battery as claimed in claim 1, wherein the case is a pouch.

15. The secondary battery as claimed in claim 1, wherein the case comprises a laminate sheet comprising aluminum or an alloy thereof.

* * * * *